May 13, 1924.
G. L. WHITEHEAD
ACCOUNT BOOK
Filed June 22, 1922
1,494,201
4 Sheets-Sheet 1
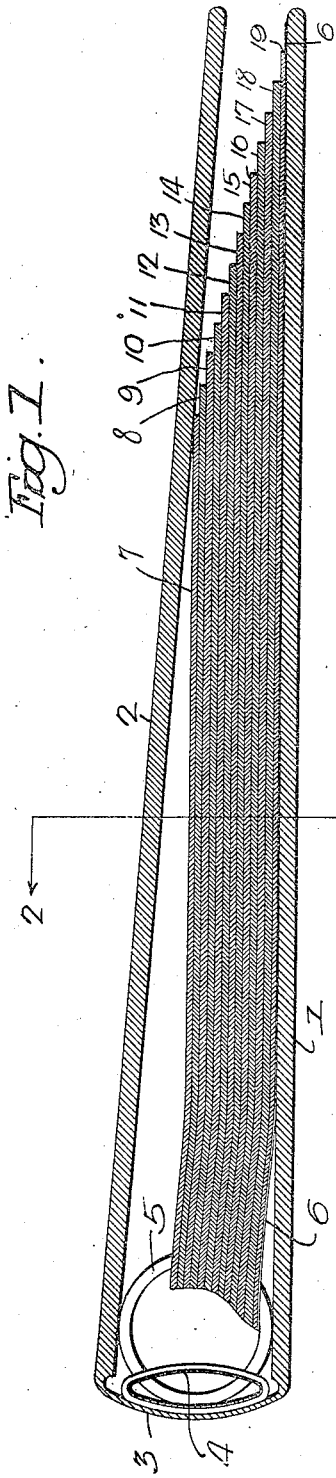
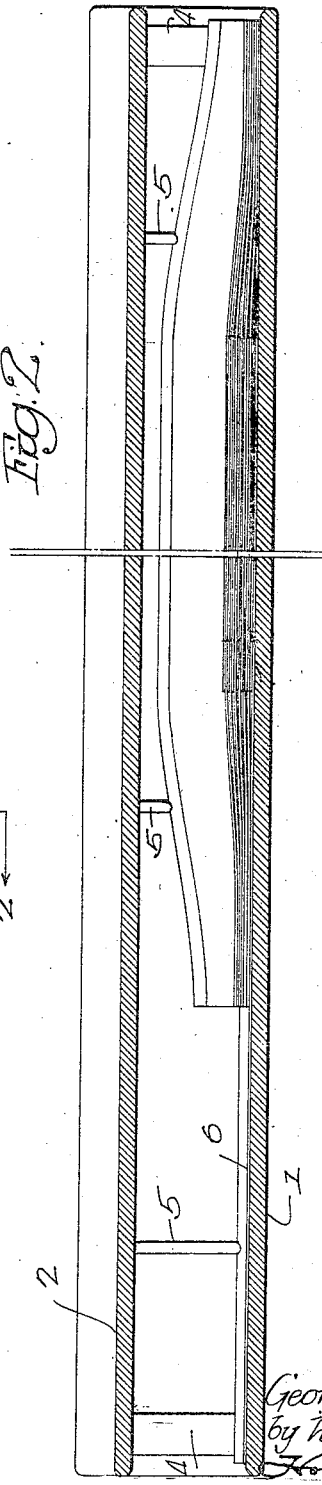
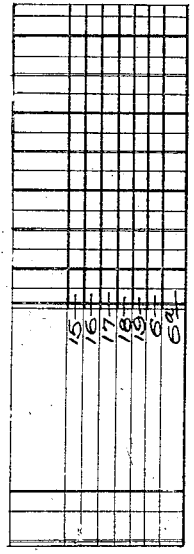
Inventor—
George L. Whitehead.
by his Attorneys—
Howson & Howson May 13, 1924.

Figure 5:
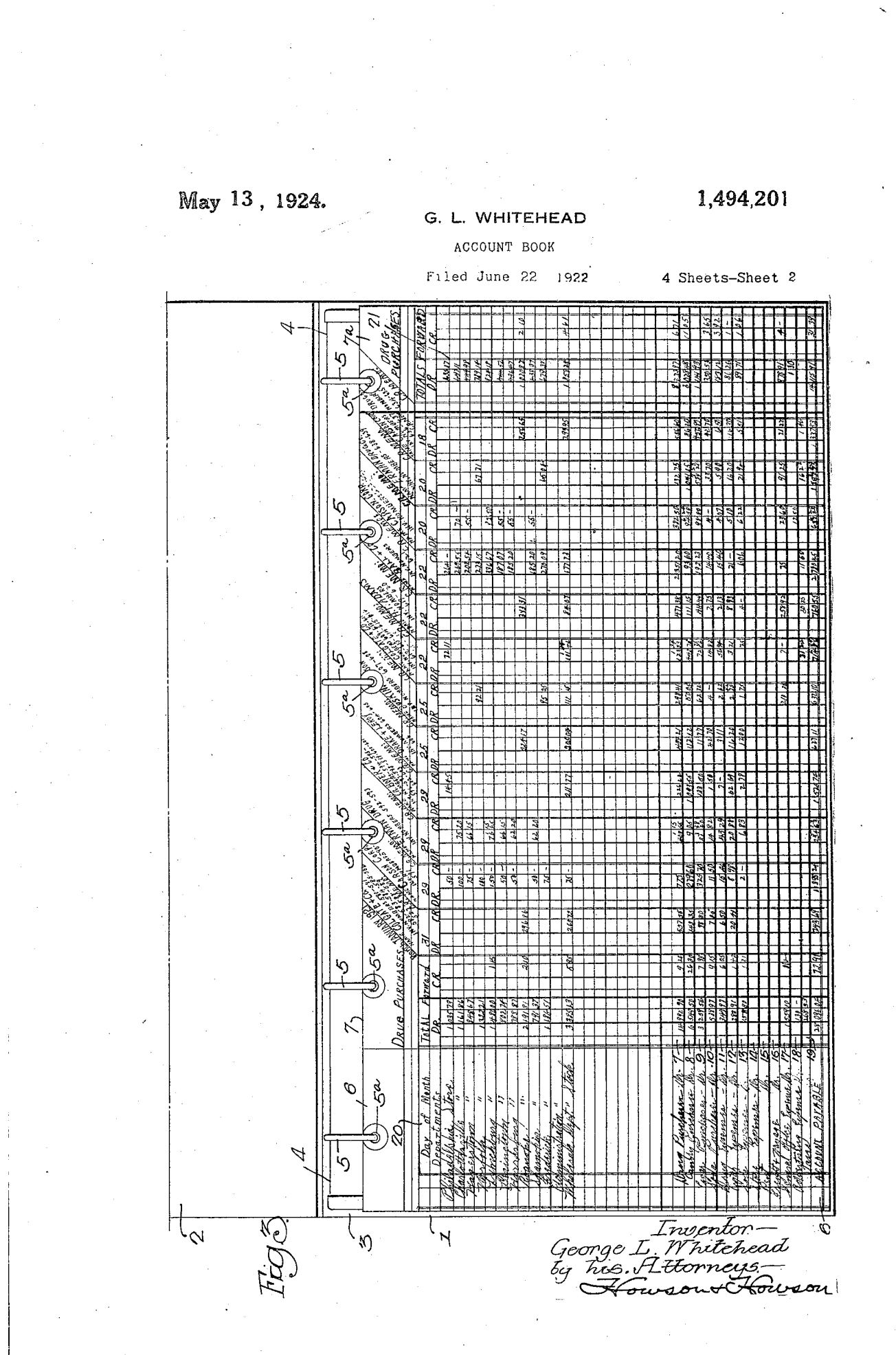

G. L. WHITEHEAD

ACCOUNT BOOK

Filed June 22, 1922     4 Sheets-Sheet 2

Inventor—
George L. Whitehead
by his Attorneys,—
Howson & Howson

May 13, 1924.

G. L. WHITEHEAD

ACCOUNT BOOK

Filed June 22, 1922

Inventor.
George L. Whitehead
by his Attorneys
Howson & Howson

May 13, 1924.
G. L. WHITEHEAD
ACCOUNT BOOK
Filed June 22 1922
1,494,201
4 Sheets-Sheet 4
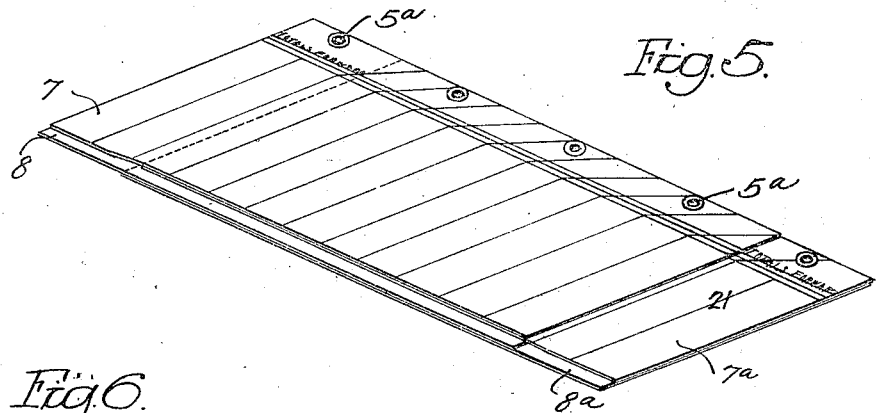
Inventor:- George L. Whitehead
by his Attorneys - Howson & Howson Patented May 13, 1924.

1,494,201

UNITED STATES PATENT OFFICE.

GEORGE L. WHITEHEAD, OF WILMINGTON, DELAWARE.

ACCOUNT BOOK.

Application filed June 22, 1922. Serial No. 570,163.

*To all whom it may concern:*

Be it known that I, GEORGE L. WHITEHEAD, a citizen of the United States, residing in Wilmington, Delaware, have invented an Account Book, of which the following is a specification.

This invention relates to devices for use in accounting and more especially has to do with a novel form of invoice register or account book particularly designed for use in providing a comprehensive departmental record of all purchases of any description made on credit, the construction of the book and its arrangement being such that the following information, both in detail and in toto, is cumulatively recorded so as to be available at any time after the current sheets containing the original entries have been totaled and checked, i. e.,—(1) the total of any class of purchases or of all of a number of classes of purchases made up to the time the current or top sheet has been totaled or to the end of any period desired, in any single department or in all of a number of departments; (2) the total value of any class of goods returned or allowances made up to the time that the sheet has been totaled or to the end of any period desired, in any single department or the total value of any or all classes of goods returned and allowances made in all of a number of departments; and the invention especially contemplates such an arrangement of record sheets as will permit the above records to be appreciated or inspected at a glance.

Another object of the invention is to provide such an arrangement of sheets or forms as will, when said sheets have received proper entries of purchases, credits, etc. and have been duly totaled and checked, cause certain data to be so positioned that it may be utilized not only in continuing such records for a longer period, but will give at a glance certain information which ordinarily could only be obtained by a large amount of labor and with the probability of error.

I also desire to provide an account book whose arrangement of pages or sheets is such as to avoid the necessity for transferring totals from the bottom of one page to the top of the succeeding page and which will permit of the recording and utilization of its entries in a manner rendering possible the highest accuracy of results and permitting checking of the results to be accomplished with a minimum of labor.

These objects and other advantageous ends I attain as hereinafter set forth, reference being had to the accompanying drawings, in which, Fig. 1 is a transverse vertical section, to some extent diagrammatic, taken through an account book constructed in accordance with my invention;

Fig. 2 is a vertical section on the line 2—2, of Fig. 1;

Fig. 3 is a plan of the book with the top cover turned back;

Fig. 5 is a perspective view of two adjacent pages or sets of pages constructed and arranged in accordance with my invention;

Figs. 6 and 7 are plan views of the two pages shown in Fig. 5; and

Fig. 8 is a fragmentary plan of a modification of one feature of my invention.

Figure 4:
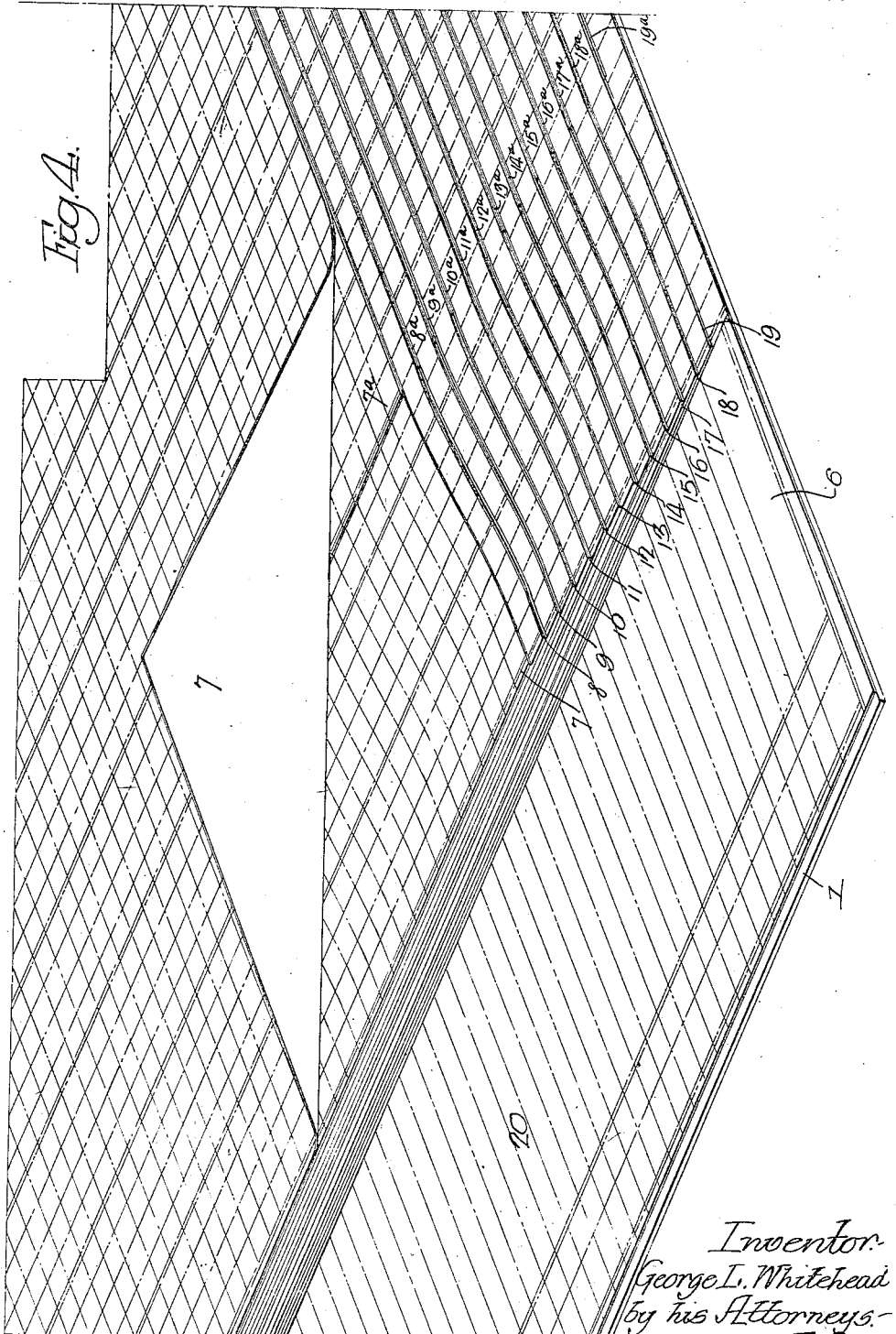
Fig. 4 is a fragmentary perspective view illustrating the construction shown in Fig. 3.

In the above drawings, 1 and 2 represent the bottom and top covers of my book, which are flexibly connected by a back 3. This latter has fastened to its inner face a flattened tubular metallic structure 4 in which are mounted a number of metallic rings 5 each made in a plurality of parts movably connected so as to permit of the convenient insertion and removal of the record receiving sheets of the book, the holes in the sheets $5^a$ being reinforced to prevent tearing by means of cloth discs of the same size as the holes, pasted on or made a part of the sheet.

In accordance with my invention these sheets or pages include a bottom or base sheet 6 preferably of slightly smaller external dimensions than the internal face of the bottom cover 1, upon which it rests. Immediately above this base sheet are any suitable number of pairs or sets of sheets, 7—$7^a$, 8—$8^a$,—19—$19^a$, of which the sheets of any pair have the same width while the sheets of successive pairs or sets vary progressively in width by an amount which is preferably substantially uniform and should be sufficient to accommodate or receive a horizontal series of numbers.

These pairs or sets of sheets or pages are mounted on the rings 5 and lie between the covers 1 and 2 so that the sheets of the widest pair are directly upon and have the same width as the base sheet 6, while the other pairs of sheets, arranged to progressively decrease in width, rest upon the first pair so that the narrowest sheets are the topmost and one of them as 7 is completely exposed when the cover 2 is thrown back. As a consequence, below the bottom edge of this topmost sheet the bottom edges of one sheet of each of the underlying pairs or sets are exposed in stepped relation, as shown in Figs. 1 and 4.

The lengths of the sheets 7—7a, etc., above the base sheet 6 and their positioning by reason of the placing of the holes 5a for the rings 5, is such as to at all times expose a portion of the left hand end of said base sheet, which in the case illustrated, is ruled horizontally to provide spaces for the names of the branches or departments of the corporation or other business whose transactions, etc. are to be recorded. All of the overlying sheets are likewise ruled horizontally respectively in line with the rulings of the base sheet and are also divided by vertical lines into vertically extending columns subdivided by other vertical lines in any desired manner.

As shown in Figs. 5 to 7, the sheets, 7 and 7a for example, of any pair, while preferably of the same length, have their ring-receiving holes 5a so positioned that they are laterally displaced relatively to each other, with the result that the left hand end of the upper sheet overhangs the adjacent end of the lower sheet, thus exposing the right hand end of the latter for a sufficient length to permit of the placing therein of a column of figures representing totals, as hereinafter described.

For the purpose of illustrating the use or application of my invention I will describe the method of its use for keeping a record of all purchases of a number of different classes of goods by the branch stores of a corporation. The names of the various branch stores are entered in the upper part of the column 20 at the left hand end of the base sheet, one below the other, and each pair of sheets 7—7a, 8—8a, etc. is employed to receive the record of the purchases of any one class of goods.

In the case noted for example, the topmost pair and narrowest sheets 7—7a are used to receive the records of the drug purchases, the amounts of these for the earlier days of a given month being entered in the vertical columns on one of the under sheets 7a on the horizontal lines of the various branch stores making such purchases,—the entries beginning at the left hand end of the page and the purchases as well as the credits or allowances made on goods returned from any particular concern being entered in the same column, the purchases in black and the credits in red ink. After all the various columns of this second sheet have received their entries up to that column or columns which are exposed beyond the right hand end of the upper sheet 7, the purchases, whose amounts are noted in the several horizontal lines, made by the different branch stores, are totaled and these totals are placed in the left hand or "Dr." column as 21 at the right hand end of the sheet 7a under the general heading "Totals forward", where they are obviously plainly visible when the cover 2 is raised, even though the top sheet 7 be in its normal position on said second sheet 7a.

Other entries of purchases made from various business houses during the later days of the month, by the various branch stores, are now entered in the columns of the top sheet 7, which columns are designated at their upper ends by the date and the name of the house from which the purchase was made, the entries beginning at the right hand end of the sheet and running toward the left. Assuming that the sheet is of sufficient length to receive all of the entries of drug purchases necessarily made for the balance of a given month, the totals for the month are now placed in the extreme left hand column of this top page 7, being obtained by adding all of the purchases on any horizontal line of the top sheet to the total shown by the exposed position of the sheet 7a in the same horizontal line under the head of "Totals forward".

Obviously, although two sheets have been used in making the above entries and obtaining the totals, it has not been necessary to make any transfer or duplication of figures so that at a glance it is possible to note the total monthly purchases of the class of goods noted, made by any of the branch stores of the company. Obviously the total of the purchases of that class made by all the branch stores is obtainable by adding the "Totals forward" column of the top page and it is likewise possible to easily and quickly record the total purchases made from any one concern on any one day by adding the entries of the vertical column devoted to that concern, these individual totals being always in position to be easily and rapidly posted to the "Accounts payable" ledger. By totaling all of these daily purchases as found on the bottom horizontal lines of the two sheets, and adding this to the total of the column "Totals forward" at the end of the under sheet, it is possible to obtain an amount which, if correct, will be the same as that of the sum of the "Totals forward" column at the left hand end of the top sheet. By a similar series of entries, the purchases for the month by the several branch stores of another class of goods, as for example tobacco products, may be entered on the next wider pair of sheets 8—8ª, the purchases of still another class of goods on a third pair of still wider sheets 9—9ª, and so on, and as a result it will be found that the total monthly purchases of the second class of goods of all the branch stores will appear (when the sheets overlie each other with the top cover thrown back) in an exposed position immediately under the total entry at the bottom of the "Totals forward" column of the topmost pair of sheets.

For the sake of identification, the names of the particular classes of goods are placed in the lower part of the end space 20 of the base sheet in line with the particular totals of the purchases of the corresponding pairs of record sheets, so that it is a matter of the utmost convenience to add up the resulting column of totals to obtain the grand total of the purchases of all goods made by all of the branch stores of the company for the month. Obviously it is also a simple matter to ascertain the total purchases made for any given period less than a whole month, covering either one class of purchases, etc. made by all departments or all classes of purchases, etc. made by all departments, and in each instance the result obtained may be quickly and easily checked by the addition of the totals in the various horizontal lines as compared with the totals of the vertical column.

It is understood that under conditions of practice each of the individual vertical columns for original entries (as 7) to the right of the two columns for totals under "Totals forward" will be utilized (that is, the same column) to receive the original entry either, (1) of a purchase from any particular creditor, or (2) a credit allowed for any reason, the former being entered in black ink in each instance, and the latter in red; so that after this has been done and a sheet is filled and ready to be totaled, all the black figures on any one line opposite any department are gathered into one total and the result (which includes the total gathered in the same way on the preceding or underlying sheet) is placed in the left hand or debit column under "Totals forward", while the red figures are gathered into one total in the same way and the result placed in the right hand or credit column under "Totals forward".

While I have referred in the description and claims to "pairs" of sheets of the same width, it is obvious that without departing from my invention the number of sheets of the same width may be more than two in case the number of entries is such as to make this necessary. Under these conditions the third and succeeding sheets would alternately project beyond the right and left hand ends of the sheets under them, so that in every case there would be exposed a column of "Totals forward" figures at one end of one sheet and a column of final "Totals forward" at the opposite end of the underlying sheet. A number of such blank sheets of the proper dimensions would for greater convenience be kept underneath used sheets and those being used, to be removed and placed on top as needed.

While for the sake of illustration I have shown my invention as utilized for recording and summing up the transactions of the branch stores of a company, it is obvious that with the same or an equivalent mechanical arrangement of pages, without departing from my invention, it may be utilized for widely different purposes;—the esential features of my invention contemplating the use either singly or together of the base sheet, the stepped arrangement of a series of sets of sheets of progressively varying widths and the use in each set of sheets, of two or more page or sheet elements laterally displaced so that a portion, as the end of one sheet, is caused to project beyond the end of the overlying sheet. Obviously under certain conditions, the base sheet may be omitted without departing from my invention. Also, more than one base sheet may be used as in Fig. 8, without departing from my invention, because by using one or more additional base sheets of sufficient additional width to allow grand totals to appear in sight one line below the preceding base sheet and employing the same system of auxiliary sheets between them, additional records of various other related functions of the business could be so coordinated with the records before described as to allow the grand totals of each to appear in the same vertical alignment as before described.

I claim:

1. The combination in an account book of a number of sets of sheets of which those of each set are of the same width and same length and are alternately displaced at their sides relatively to each other; the sheets of different sets being of different widths; and all of said sheets being horizontally ruled and also being ruled vertically to provide columns.

2. The combination in an account book of a number of sets of sheets of which those of each set are of the same width and length and are laterally displaced relatively to each other, to expose at each end alternately an under sheet beyond an overlying sheet, the sheets of different sets being of progressively varying widths, being horizontally ruled and being also ruled vertically to provide columns.

3. The combination in an account book of a number of sets of sheets of which those of each set are of the same width and are displaced longitudinally relatively to each other so that successive sheets have end portions respectively exposed alternately at opposite ends of the same set.

4. The combination in an account book of a number of sets of sheets arranged in stepped relation, the sheets of each set being of the same width and length and laterally displaced relatively to each other, the narrowest sheets being uppermost.

5. The combination in an account book of a number of sets of sheets arranged in stepped relation, the sheets of each set being of the same width and longitudinally displaced relatively to each other so that successive sheets have end portions respectively exposed alternately at opposite ends of the same set.

6. The combination in an account book of a number of sets of sheets arranged in stepped relation, the sheets of each set being of the same width and longitudinally displaced relatively to each other to expose one end of an under sheet beyond an overlying sheet; with a base sheet underlying said sets of sheets and having a portion exposed at one side thereof.

7. The combination in an account book of a number of sets of sheets of which those of each set are of the same width and the sheets of different sets are of progressively varying widths; with a base sheet underlying said sets of sheets and having a portion exposed at one side thereof.

8. The combination in an account book of a number of sets of sheets of which those of each set are of the same width and the sheets of different sets are of progressively varying widths; with a plurality of base sheets underlying said sets of sheets and each having a portion exposed at one side thereof.

9. The combination in an account book of a number of sets of sheets of which those of each set are of the same width and the sheets of different sets are of progressively varying widths; with a plurality of base sheets arranged in stepped relation underlying said sets of sheets and each having a portion exposed at one side thereof.

10. The combination in an account book of a back; retaining elements attached to said back; a base sheet; and a number of sets of sheets held in place by said retaining elements, said sets of sheets being arranged in stepped relation upon the base sheet and the latter having a portion exposed beyond one side of said sets of sheets, the sheets of each set being of the same width and being held by the retaining elements so that a portion of the under sheet is exposed beyond an end of an overlying sheet.

11. The combination in an account book of a back; retaining elements atached to said back; a base sheet; and a number of sets of sheets held in place by said retaining elements, said sets of sheets being arranged in stepped relation upon the base sheet and the latter having a portion exposed beyond one side of said sets of sheets, the sheets of each set being of the same width and being held by the retaining elements so that a portion of the under sheet is exposed beyond an end of an overlying sheet, the base sheet and the sets of sheets having aligned horizontal rulings and the sets of sheets and the base sheet being also ruled to divide them into vertical columns.

12. The combination in an account book of a back; retaining elements attached to said back; a number of base sheets; a number of sets of sheets held in place by said retaining elements, said sets of sheets being arranged in stepped relation upon each of the base sheets, the sheets of each set being of the same width and being held by the retaining elements so that a portion of the under sheet is exposed beyond an end of an overlying sheet; each of the base sheets having a portion exposed beyond one end of said sets of sheets, all of the base sheets being of progressively varying widths, each of the base sheets and its associated sets of sheets having aligned horizontal rulings and the sets of sheets and the base sheets being also ruled to divide them into vertical columns.

GEORGE L. WHITEHEAD.